(12) United States Patent
Nikula et al.

(10) Patent No.: US 6,690,751 B1
(45) Date of Patent: Feb. 10, 2004

(54) METHOD AND RECEIVER FOR RECEIVING AND DECODING SIGNALS MODULATED WITH DIFFERENT MODULATION METHODS

(75) Inventors: Eero Nikula, Espoo (FI); Harri Jokinen, Hiisi (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/548,650

(22) Filed: Apr. 13, 2000

(30) Foreign Application Priority Data

Apr. 14, 1999 (FI) .................................. 990834

(51) Int. Cl.[7] .......................... H03M 13/12; H04N 9/68
(52) U.S. Cl. ........................ 375/341; 375/261; 348/726
(58) Field of Search ................. 375/341, 261, 375/262; 348/726; 714/755, 780, 796

(56) References Cited

U.S. PATENT DOCUMENTS

| | | | | |
|---|---|---|---|---|
| 5,497,401 A | * | 3/1996 | Ramaswamy et al. | ...... 375/341 |
| 5,717,471 A | * | 2/1998 | Stewart | ............ 348/726 |

FOREIGN PATENT DOCUMENTS

| | | | | |
|---|---|---|---|---|
| EP | 0 844 758 A2 | * | 5/1998 | ............ H04L/1/00 |
| EP | 0844758 A2 | | 5/1998 | |
| EP | 0 847 169 A2 | * | 6/1998 | ........... H04L/27/00 |
| EP | 0866578 A2 | | 9/1998 | |
| EP | 0 866 578 A2 | * | 9/1998 | ............ H04L/1/00 |
| WO | WO 99/39484 | * | 8/1999 | ........... H04L/27/00 |
| WO | WO 99/66658 | * | 12/1999 | ............ H04B/7/10 |

OTHER PUBLICATIONS

"Radio Interface Performance of EDGE, a Proposal for Enhanced Data Rates in Existing Digital Cellular Systems", Peter Schramm et al., Vehicular Technology Conference, 1998. VTC 98 48 th IEEE, vol. 2, 1998, pp. 1064–1068.*

"System Performance of EDGE, a Proposal for Enhanced Data Rates in Existing Digital Cellular Systems", Furuskar A. et al., Vechicular Technology Conference, 1998, VTC 98 48th IEEE.*

* cited by examiner

*Primary Examiner*—Stephen Chin
*Assistant Examiner*—Edith Chang
(74) *Attorney, Agent, or Firm*—Perman & Green, LLP

(57) ABSTRACT

A method is presented for demodulating and decoding a block of received digital information consisting of a number of subblocks. One of a predefined number of demodulation methods is selected for demodulating each subblock and each subblock is demodulated with the demodulation method selected for it. The subblocks constituting a block of digital information are combined between their demodulation and the decoding of the block of digital information. Soft decoding is used to decode the block of digital information, wherein each subblock is converted to a sequence of soft decoding values associated with certain probabilities of allowed state transitions in the decoding process. For each subblock it is determined, after its demodulation, whether the correct demodulation method was selected for it. A subblock for which it is found that the correct demodulation method was not selected is converted to a sequence of neutral soft decoding values indicating equal probabilities for all allowed state transitions in the decoding process.

9 Claims, 3 Drawing Sheets

METHOD AND RECEIVER FOR RECEIVING AND DECODING SIGNALS MODULATED WITH DIFFERENT MODULATION METHODS

TECHNOLOGICAL FIELD

The invention concerns generally the receiving and decoding of digital signals over a radio interface. Especially the invention concerns the receiving and decoding of a signal where consecutive parts may have been modulated with a different modulation method in the transmitting end, when the receiver does not know the applied modulation method before receiving the signal.

BACKGROUND OF THE INVENTION

Attempts have been made to enhance the throughput of digital radio transmission systems by allowing the use of different modulation methods according to the signal propagation conditions and/or the nature of the information to be transmitted. As an example we will consider the proposed EDGE cellular radio system (Enhanced Data rates for GSM Evolution), which is a further developed addition to the known GSM (Global System for Mobile telecommunications). EDGE recognizes two modulation methods, of which eight-level phase shift keying or 8-PSK allows for the representation of a sequence of three bits with one transmission symbol, whereas gaussian minimum shift keying or GMSK only uses one bit to create each transmission symbol. In each of these modulation methods the information content of a transmission symbol is coded into the phase angle of the symbol compared to a certain reference phase. The present invention is not limited to application with phase modulation methods, although some of its features require a number of obvious modifications if some other methods like amplitude or frequency based modulation are used.

FIG. 1 is a simplified representation of an EDGE transmitter-receiver pair. The transmitter comprises a channel encoder 101 to perform some channel coding, a modulator 102 to transform the stream of channel encoded bits into a corresponding stream of modulation symbols, and a phase rotator 103 to implement a selected phase rotation to the symbols in the stream produced by modulator 102. The operation of all these blocks is controlled by a control block 104 in a manner known as such. For example, the control block 104 possesses the information about which modulation mathod should be used at any given time, and what amount of channel coding implemented with which encoding method should be performed. A transmitter radio frequency part 105 converts the complete stream of phase rotated modulation symbols into a radio frequency signal that will be transmitted to the receiver.

The receiver comprises a receiver radio frequency part 110 to convert the received radio frequency signal to a lower frequency, a symbol derotator 111 to remove the phase rotation, a demodulator 112 to convert the stream of modulation symbols back to a sequence of bits, and a channel decoder 113 to remove the channel coding. The operation of these blocks is again controlled by a control block 114 that should be able to select the correct phase derotation, demodulation and decoding operations at any given moment.

In general terms the phase rotation may be construed to be a part of the modulation process and correspondingly the phase derotation may be construed to be a part of the demodulation process. In EDGE they are usually presented as separate operations, because the modulation and demodulation proper take place according to the known 8-PSK and QMSK principles, which are described in the literature in their masic form without additional phase rotations and derotations.

The transmission between the transmitter and the receiver takes place in bursts, and changing the modulation method is only allowed between bursts; a single burst is always modulated with a single modulation method in EDGE. Changing the modulation method in the middle of a burst would be technically possible but it would require somewhat complicated transmitter and receiver structures. In practical systems there are also limitations that require a certain minimum number of bursts to be transmitted with a certain modulation method before the modulation method is again changed. A widely proposed minimum number of consecutive bursts for this purpose is four.

The EDGE receiver generally does not know beforehand about the coming changes in the applied modulation method. Each burst comprises a so-called training sequence the constant form of which is known. At the phase derotation and demodulation stage the receiver checks, was the training sequence reproduced in its correct form. The different phase rotation methods associated with the use of different demodulation methods should ensure that only the correct demodulation method and its associated phase derotation produce the correct training sequence.

A problem arises when the signal propagation conditions at the radio interface are so bad that the receiver is not able to correctly recognize the applied modulation method on the basis of the above-explained phase rotation arrangement. Such bad conditions could mean that the received carrier-to-interference ratio (C/I) or bit energy per noise density ($E_b/N_O$) is low, the delay spread in the received signal is long relative to the equalizer span of the receiver, or the relative speed between the transmitter and the receiver is high. The receiver usually derotates and demodulates the received bursts in their order of reception, and a decision once made can not be reversed even if it were subsequently found out that a certain burst or a number of bursts were demodulated with the wrong demodulation method.

An incorrectly demodulated burst will have an effect on the channel decoding stage. Channel encoding and decoding is usually performed on blocks of information that are longer than the contents of one burst. A typical block to be channel encoded and decoded houses the contents of four bursts. If one or several of these bursts were demodulated with the wrong demodulation method, the decoding of the whole block will probably fail causing a retransmission request to be transmitted from the receiver to the transmitter.

There are two obvious solutions to the above-mentioned problems. The first solution would be to explicitly indicate to the receiver the modulation method that was used to modulate each burst. The indication should be conveyed to the receiver with very high reliability, because an incorrectly received indication would only make the problem worse. This solution would increase the signalling needs between the transmitter and the receiver, which is an undesired direction of development. The second solution is to have a large memory in the receiver and to store each received burst in its undemodulated form long enough for the receiver to be sure which method should be applied in its demodulation. The is solution is uneconomical since the demodulation and decoding operations are already quite memory-intensive and the solution would again considerably increase the amount of memory to be built into the receiver.

SUMMARY OF THE INVENTION

It is an object of the present invention to provide a method and a receiver arrangement that reduce the detrimental effects of incorrectly recognized modulation in a receiver. It is an object of the invention that it should not considerably increase the signalling needs between the transmitter and the receiver or the amount of required memory in the receiver.

The objects of the invention are achieved by using soft decoding at the channel decoding stage and by suppressing the influence of the incorrectly demodulated symbols through the use of neutral soft decoding values for their representation. The incorrectly demodulated bursts are most advantageously recognized by using the known limitations of allowed modulation changes.

The method according to the invention is characterized in that soft decoding is used to decode a block of digital information, wherein each subblock of said block is converted to a sequence of soft decoding values associated with certain probabilities of allowed state transitions in the decoding process, for each subblock it is determined, after its demodulation, whether the correct demodulation method was selected for it and a subblock for which it is found that the correct demodulation method was not selected is converted to a sequence of neutral soft decoding values indicating equal probabilities for all allowed state transitions in the decoding process.

The invention also applies to a receiver which is characterized in that the decoder contained therein is a soft decoder arranged to handle each subblock as a sequence of soft decoding values associated with certain probabilities of allowed state transitions in the decoding process, the receiver is arranged to determine for each subblock whether the correct demodulation method was selected for it and the decoder is arranged to convert such subblocks to sequences of neutral soft decoding values for which it is found that the correct demodulation method was not selected, where said soft decoding values indicate equal probabilities for all allowed state transitions in the decoding process.

If conventional channel decoding arrangements are used, incorrectly demodulating a burst will produce a sequence of bits which represent basically a random selection of bit values 0 and 1. However, there is also known a concept called soft decoding, which means that the demodulator does not give unambiguous bit values at its output but a number of transition probabilities that represent the probability of certain state transitions in the channel decoder. By using soft decoding (as in some cases of more general digital decoding) it is possible to correctly decode even a digital information sequence where some bits or bit combinations have completely unknown values. According to the invention, after it has been established that a certain burst has been incorrectly demodulated, the corresponding demodulation results are replaced with a sequence of soft decoding values that give an equal probability to all allowed state transitions in the channel decoder.

Interleaving is usually applied when the contents of a channel encoded block of information is mapped into transmission bursts. This ensures that even if one burst is lost in the receiver in the sense that it only gives rise to a sequence of neutral soft decoding values, it may still be possible to correctly decode the block of information to which the burst belonged: the neutral soft decoding values will only appear at isolated locations in the sequence that is input to the channel decoder, so the information about allowed state transitions in the channel decoder and the correctly demodulated soft decoding values from the other burst(s) may be enough to reconstruct the original bit sequence that was channel encoded in the transmitter. The probability of correct channel decoding despite of "erasures" increases if the receiver has the possibility of using iterative decoding, where the results of a previous decoding round as well as the original demodulated soft decoding values are used as input information to a subsequent decoding round.

An advantageous way of recognizing a certain burst as incorrectly demodulated is to observe the received burst sequence in the light of the known limitations that govern the allowed changes of modulation method. If at a certain point it is found out with reasonable certainty that a change of modulation method has occurred, it may immediately be deduced that at least as many bursts as the predefined minimum number before the observed change should have been demodulated with the first demdulation method, and at least as many bursts after the observed change must be demodulated with the second demodulation method.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
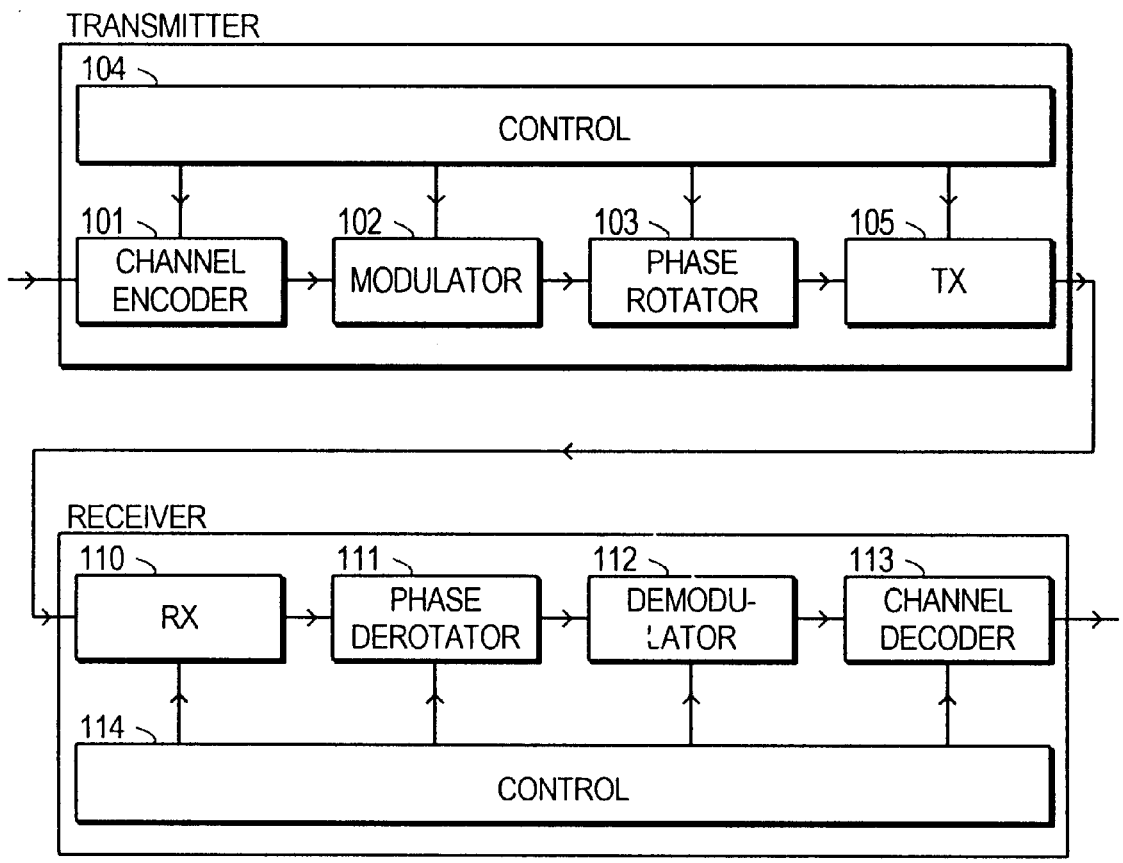
FIG. 1 illustrates a known transmitter-receiver pair in the EDGE system.
Figure 2:
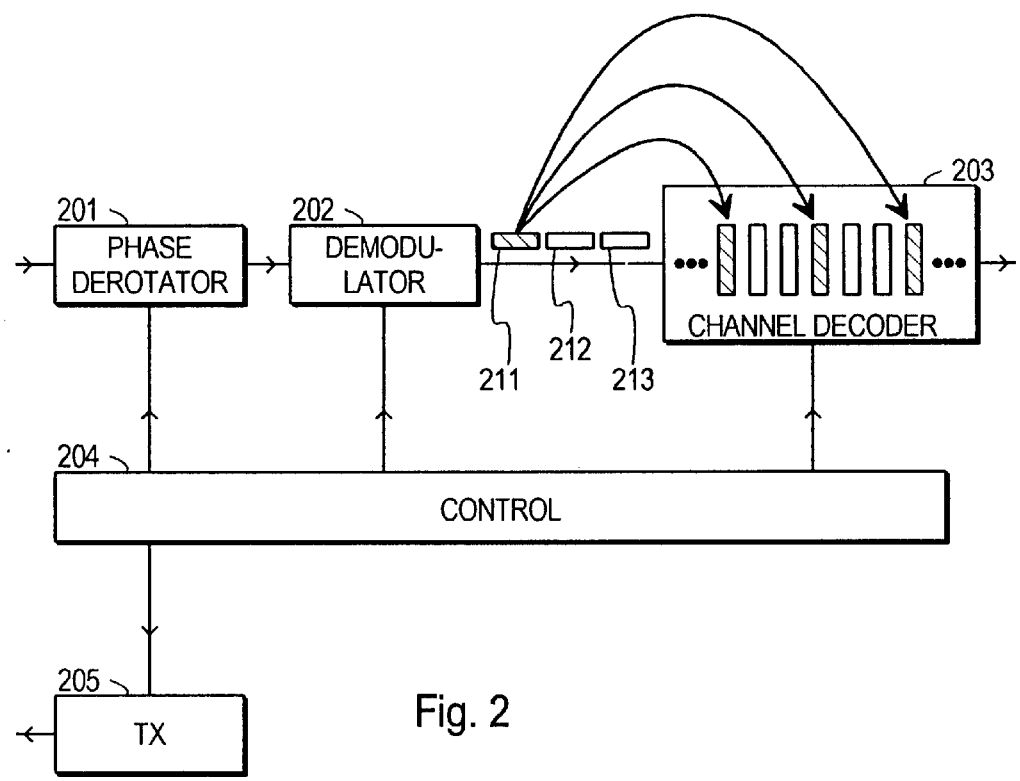
FIG. 2 illustrates a decoding process where the invention is applicable.

FIG. 2 illustrates schematically a receiver where a phase derotator 201, a phase demodulator 202 and a channel decoder 203 are connected in series and operate under the command of a control block 204 to convert a sequence of received phase modulated (and phase rotated) bursts into channel decoded blocks of digital information. The bursts enter from the left, where a radio receiver is assumed to exist although not shown, and the complete channel decoded blocks exit to the right. The output of the channel decoder 203 is preferably coupled to a speech decoder or some other information processing block (not shown) that is to use the information transmitted over a radio interface.

There is also a connection from the control block 204 to a transmitter block 205 so that if a certain information block was found to be so badly corrupted that successful decoding is impossible, a retransmission request may be transmitted to the transmitting device concerning all or part of the bursts associated with that information block. Additionally or alternatively there is a connection from the control block 204 to said information processing block through which connection the control block may order the information processing block to ignore the information blocks the decoding of which was unsuccessful.

In FIG. 2 it is assumed that the phase derotator 201 and the phase demodulator 202 apply a certain pair of mutually associated phase derotation and phase demodulation methods at any given time, and once a derotated and demodulated burst is output from the phase demodulator 202, it will not be derotated or demodulated again even if it were found that an incorrect phase derotation and/or phase demodulation method had been applied. FIG. 2 illustrates three derotated and demodulated bursts 211, 212 and 213 of which we may assume for the sake of example that burst 211 was incorrectly derotated and demodulated. At the output of the phase demodulator 202 each burst 211, 212 and 213 is a sequence of soft decoding values. We may further assume that the bursts 211, 212 and 213 together form the representation of a complete information block to be channel decoded.

The channel decoder 203 is a "soft" decoder, for example a so-called Viterbi decoder, where the decoding process is represented by a continuous chain of state transitions. Each state transition is considered by taking into account the allowed transitions between the current state and the available subsequent states, and consecutive state transitions give rise to a number of mutually alternative decoding paths. In the case of Viterbi decoding the decoding paths are also known as Trellis paths, and each state also represents a bit or bit combination to be output as a pail of the decoded bit sequence. After each state transition a metric is calculated for each surviving decoding path by taking into account the current soft decoding value which has been obtained from the phase demodulator. One or several decoding paths are selected after each transition as the most probable paths to continue with, and at the end of the decoding of a certain block die path with the most advantageous metric is selected: the series of concatenated bits or bit combinations associated with the states through which the selected path has come then represent the most probable form of the decoded bit sequence. Several detailed algorithms exist for selecting the surviving and final decoding paths, and the invention does not require any particular algorithm to be used.

In FIG. 2 the state transitions in the channel decoder 203 are represented as vertical rectangles. A diagonal deinterleaving operation is supposed to be a part of the channel decoding process, whereby the soft decoding values from the incorrectly derotated and demodulated burst 211 only affect every third state transition as illustrated by the arrows. We suppose that when the channel decoding of the information block represented by the bursts 211, 212 and 213 starts, the control block 204 is already aware of that burst 211 was incorrecly derotated and demodulated. Later we will discuss some alternative ways of generating this knowledge.

In accordance with the invention, the control block 204 commands the channel decoder 203 to replace all soft decoding values that have their origin in the incorrectly derotated and demodulated burst 211 with "neutral" soft decoding values. By "neutral" we mean that the replacement values do not actually favor any of the allowed state transitions but give an equal probability for all of them. As a result, when the channel decoder calculates the metrics for the surviving paths after a state transition associated with a soft decoding value from the incorrectly derotated and demodulated burst 211, the order of preference of the paths surviving so far does not change.

After having decoded the whole information block, the channel decoder 203 usually calculates a CRC checksum (Cyclic Redundancy Check) or otherwise tries to ensure that the contents of the information block have not changed, i.e. the reception and decoding have been successful. It may happen that the neutral soft decoding values inserted according to the invention were enough to lead the whole decoding operation astray, in which the CRC check will fail and a retransmission request must be transmitted through the transmitter block 205. It should be noted that in such case the invention did not weaken the performance of the system: the random values which resulted from the incorrect phase derotation and/or demodulation would have caused the same and a retransmission would have been required anyway. However, it may happen that the knowledge of certain state transitions being unreliable, represented in the form of neutral soft decoding values, is enough to enable the selection of the correct decoding path in which case the invention has removed the need for a retransmission request and improved the performance of the system.

Next we will address the problem of knowing before the start of channel decoding, which bursts have been incorrectly derotated and/or demodulated. As we have stated previously, in most radio communication systems with two or more allowed modulation methods there has been defined a minimum number of bursts which must be transmitted with a certain modulation before the modulation method is again changed. In the following we will use the exemplary minimum number four; the discussion is easily generalized to cover other minimum numbers.

Figure 3:
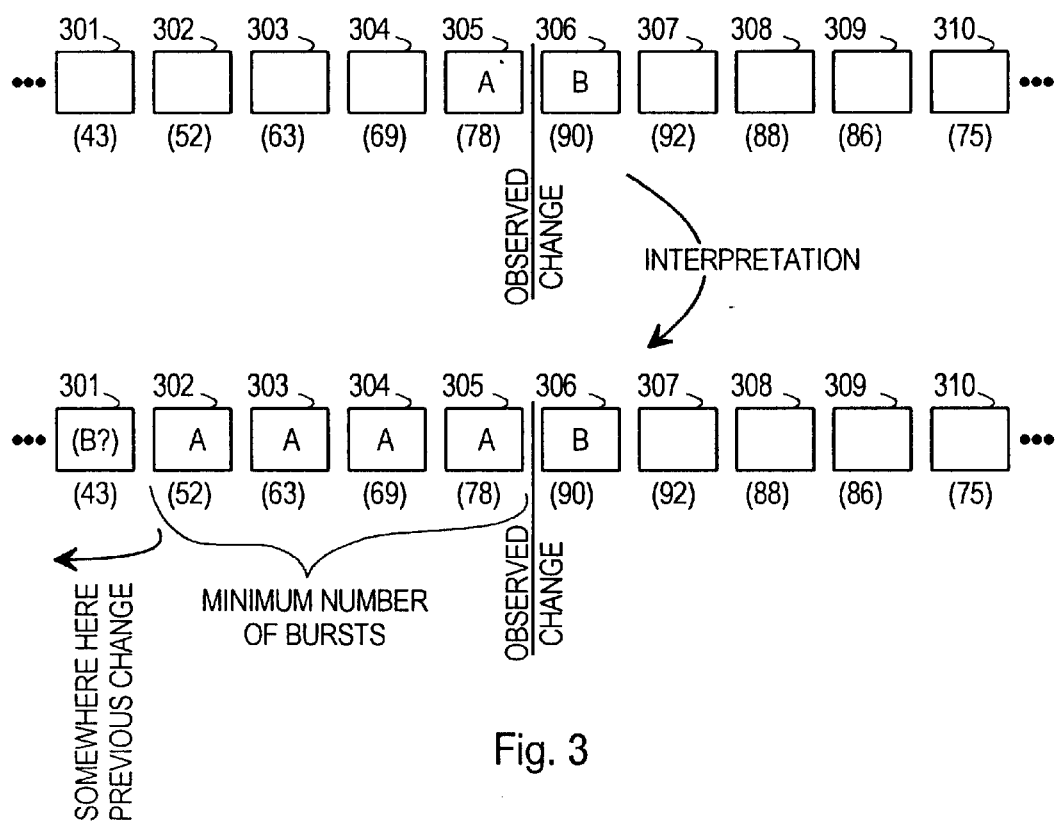
FIG. 3 illustrates the recognition of incorrectly derotated and demodulated bursts and FIG. 4 illustrates a method for deciding, which bursts appear to have been derotated and demodulated with the wrong method.

FIG. 3 illustrates a train of ten consecutive bursts 301 to 310. By using the above described trial-and-error technique where it is tried to obtain the correct form of a training sequence by applying different derotation and/or demodulation methods, or by some other means, a receiver has identified burst 305 as being modulated with modulation method A and burst 306 as being modulated with modulation method B. The corresponding demodulation methods may be designated as A' and B' respectively. If this observation is correct, the minimum number rule states that at least bursts 302, 303 and 304 must also have been modulated with modulation method A, and at least the next incoming bursts 307, 308 and 309 must also have been modulated with modulation method B. An obvious question is: how can the receiver know that the observation is correct? The situation is made worse if there has been observed another change of modulation method at a location where it breaches the minimum number rule, for example between bursts 302 and 303.

There are certain ways of estimating the certainty of such observations. An advantageous way is to associate with each burst a measured value that describes the estimated quality in reception of that burst. A typical such value is the signal to noise ratio (S/N) observed in receiving the burst. Other plausible measured values are the carrier to interference ratio (C/I) and carrier to noise and interference ratio (C/(N+ I)); also further types of measured values may exist. FIG. 3 illustrates some arbitrary measured values associated with each burst in relative form so that a value 100 would represent complete certainty in reception and value 0 would represent complete uncertainty. The values are shown in parentheses under each burst. In this example it is seen that the relative certainty in reception of bursts 305 and 306 is rather high, and the relative certainty in reception of bursts 302 and 303 is somewhat lower. If there would have been an assumed change in modulation methods between bursts 302 and 303, the most obvious interpretation is that there is a change of modulation methods between bursts 305 and 306, at some earlier stage (probably even between bursts 301 and 302) there has been an unobserved change of modulation methods, and those bursts that together with burst 305 constitute the minimum number of equally modulated bursts (i.e. bursts 302, 303 and 304, if the minimum number is 4) but have been demodulated with some other demodulation method than A' are incorrectly demodulated and the corresponding soft decoding values must be replaced with neutral values.

Figure 4:
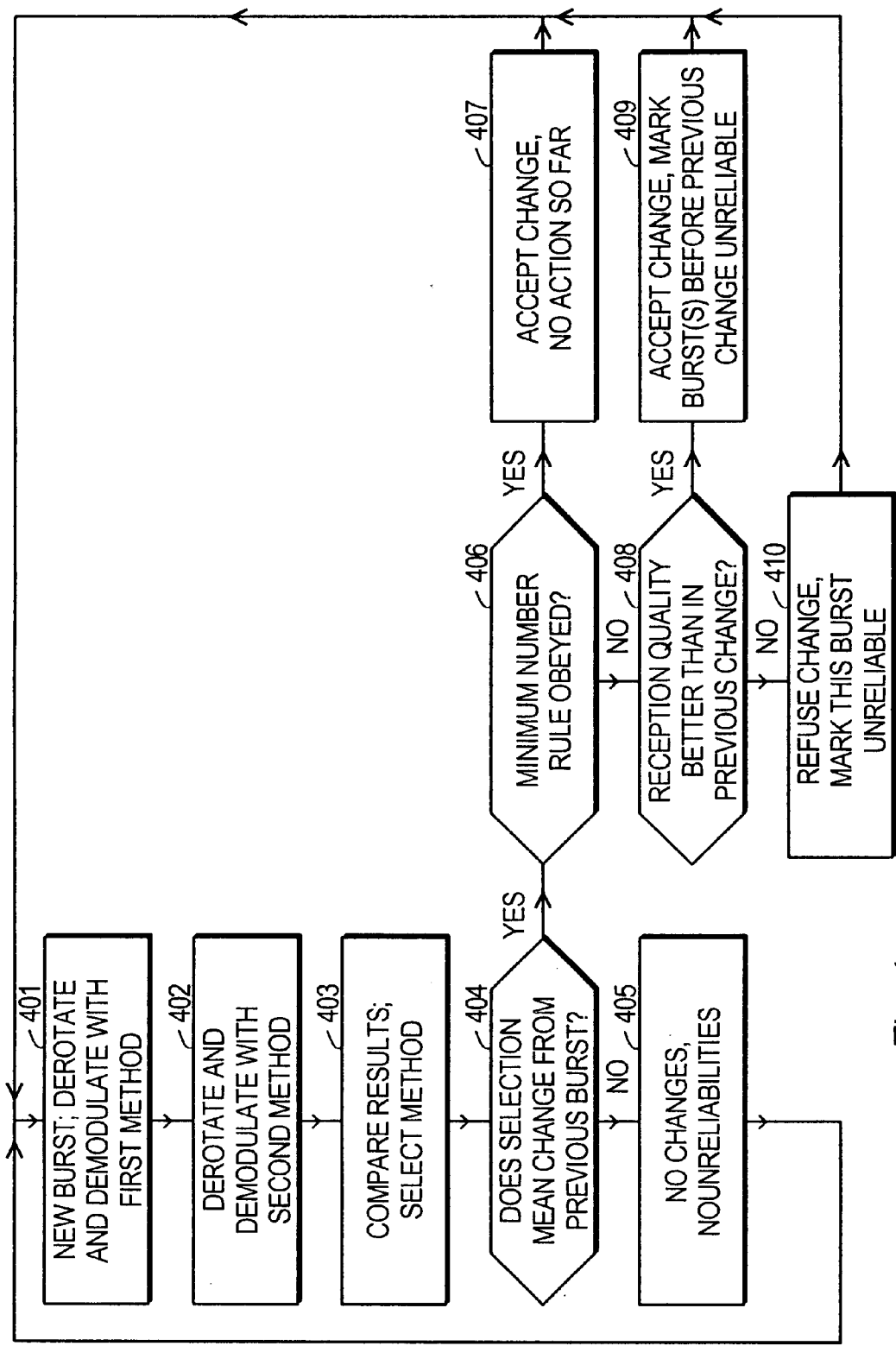

FIG. 4 illustrates in a more detailed way an exemplary method which a receiver may apply in deciding, which bursts appear to have been derotated and demodulated with the wrong method so that the corresponding state transitions at the soft decoding stage should be associated with neutral values. Such bursts will be designated as "unreliable" bursts for short. At step 401 a new received burst enters the derotation and demodulation stage and is derotated and demodulated with a first method. Somehow the receiver must be able to estimate, how accurately did this first derotation and demodulation attempt produce the correct form of the training sequence (or other part of the burst which is used to deduce, whether the choice of derotation and demodulation methods was correct). The receiver may for example calculate the cross-correlation of the received, derotated and demodulated training sequence with the known error-free form of the training sequence and temporarily store the correlation peak value.

At step 402 the same burst is derotated and demodulated with a second method, and the achieved degree of accuracy in reproducing the training sequence is again estimated. If the invention is applied to a system where more than two different modulation methods may be used, there should be other similar steps following the steps 401 and 402. Another possible variation of the method is such where the receiver is allowed to decide already after one derotation and demodulation attempt, which method is the correct one: if, for example, the estimated accuracy of reproducing the training sequence is particularly good, or the current operational conditions (known by the control block) only allow the use of a certain single modulation and phase rotation method, there is no need for any further derotation and demodulation rounds.

Step 403 corresponds to the comparison of the estimated accuracies for the receiver to choose, which of them was the correct choice. Obviously the derotation and demodulation method which gave the better accuracy is chosen at this point. Again we may propose a variation of the method in which, if there are only two possible derotation and demodulation methods to choose from and the first attempt at step 401 gave particularly bad results, the receiver may decide already before step 402 that the other method is the correct one, which would in turn cause step 403 to be omitted.

At step 404 the receiver checks, did the choice of derotation and demodulation method in step 403 mean a change from that used with the immediately preceding burst. Changes in the modulation method are estimated to be relatively rare, so by far the most common choice in step 404 is to proceed to step 405, place the derotated and demodulated burst into the input buffer of the channel decoder and to stall again from step 401 with a new received burst. If, however, a change has been observed, the next step is to check at step 406, was the minimum number rule observed, i.e. did the stream of received bursts comprise at least as many as the minimum number of consecutive bursts modulated with a certain single method before the change. Again by far the most probable finding should be positive, meaning that in accordance with step 407 the change of derotation and demodulation methods is confirmed, the derotated and demodulated burst is placed into the input buffer of the channel decoder and the process is started again from step 401 with a new received burst.

If, at step 406, the receiver finds a breach of the minimum number rule, at least one of the current and the previous changes in the derotation and demodulation methods must be an error. In the method of FIG. 4, the receiver uses, at step 408, some measured and/or estimated value describing the quality or reliability of the received signal to determine, whether the most probably erroneous change is the current one or the previous one. If the quality in signal reception was better at the moment of the currently analyzed change, the receiver proceeds to step 409 where the current change is accepted as the valid one. Those bursts are declared as unreliable that are within the "minimum number" distance backwards from the previous burst but derotated and demodulated with another method. This corresponds to the exemplary discussion given above in association with FIG. 3.

The other possible finding in step 408 is that the previous change of methods was associated with better quality in reception, meaning that it is more probably correct than the current change. This means that the current burst has been derotated and demodulated with the wrong method. We assume that the irreversibility of the derotation and demodulation still holds, so that despite of the finding it is not possible to derotate and demodulate again the present burst with the other method. Then, at step 410, the receiver deduces that the derotation and demodulation method should not have changed after all, resumes the old derotation and demodulation method as the currently valid method and declares the current burst unreliable. Resuming the old method as the valid one means that when the receiver has started again from step 401 and chosen the derotation and demodulation method for the next burst, it compares at step 403 the chosen method to the resumed valid method instead of the method that was actually (erroneously) used to derotate and demodulate the burst now declared as unreliable.

It should be noted that the concept of minimum number of consecutive bursts modulated (and rotated) with a single modulation (and rotation) method refers to the consecutive bursts in one logical connection. It is possible that there are several logical connections simultaneously active between the transmitter and the receiver so that in each logical connection a separate minimum number rule (even with a different minimum number) applies.

As an alternative or addition to the above-presented method based on the required minimum number of consecutive bursts, the receiver may apply a rule based on its knowledge about the fixed relations between the logical channels and/or the transmission frame structure on one hand and certain modulation methods on the other: in the radio transmission system it may have been defined that for example a certain logical channel may only appear in certain time slots of a transmission frame and/or superframe, and that the bursts carrying information related to that logical channel are always modulated and rotated with a certain fixed modulation and rotation method. If the training sequence-based selection then first results in a certain burst being derotated and demodulated with a certain first method, and subsequently it appears that the burst belonged to such a logical channel which requires the use of another derotation and demodulation method, the derotated and demodulated burst is declared unreliable. Similarly the receiver knows that if a training sequence-based selection indicates a wrong derotation and demodulation method for a burst transmitted in a certain time slot received exclusively for a fixed modulation and rotation method, the training sequence-based selection must be in error.

The invention further encompasses another alternative or addition to the above-presented methods based on the required minimum number of consecutive bursts or the knowledge about the fixed relations between the logical channels and/or the transmission frame structure on one hand and certain modulation methods on the other. The relative rarity of changes in the applied modulation method indicates that if a certain burst was recognized with substantial certainty to have been modulated with a certain modulation method, there is a high probability that the immediately following burst has also been modulated with the same method. The demodulator may comprise a "biasing" functionality which stores an indication about the last reliably recognized modulation method. By "reliably recognized" for example all such embodiments are covered where a cross-correlation is calculated between the demodulated training sequence and a known form of the training sequence, and a cross-correlation valure greater than a certain threshold (fixed or dynamically changeable) is regarded as indicating a reliable recognition. Next time when the demodulator is not able to reliably recognize the modulation method of an incoming burst, it uses the stored information as an educated guess. The term "biasing" given above comes from the fact that such an arrangement favors the latest reliable recognition result in a case of uncertainty.

What is claimed is:

1. A method for demodulating and decoding a block of received digital information consisting of a number of subblocks, comprising the steps of:

selecting one of a predefined number of demodulation methods for demodulating each subblock, demodulating each subblock with the demodulation method selected for it and combining the subblocks constituting a block of digital information between their demodulation and the decoding of the block of digital information, wherein soft decoding is used to decode the block of digital information, so that each subblock is converted to a sequence of soft decoding values associated with certain probabilities of allowed state transitions in the decoding process, for each subblock it is determined, after its demodulation, whether the correct demodulation method was selected for it and a subblock for which it is found that the correct demodulation method was not selected is converted to a sequence of neutral soft decoding values indicating equal probabilities for all allowed state transitions in the decoding process.

2. A method according to claim 1, wherein Viterbi decoding is used to decode the block of digital information, said Viterbi decoding comprising the steps of establishing a certain initial state of the decoding process, associating said soft decoding values with certain probabilities of allowed state transitions in a chain of state transitions starting from said initial state, repeatedly selecting a number of surviving paths through a number of states of the decoding process by extending each surviving path with the state transitions allowed from its last state, calculating metrics for the extended paths thus obtained on the basis of the corresponding soft decoding values and taking a number of the paths with the most advantageous metrics, arriving at a final surviving path by selecting the surviving path with the most advantageous metric at the moment of using the last soft decoding value for extending the surviving paths and defining a decoded block of digital information as the bit sequence representing the states through which the final surviving path advances.

3. A method according to claim 1, wherein iterative decoding is used to decode the block of digital information, said iterative decoding comprising the steps of decoding the same block of digital information for a number of times and using, at each decoding round, the demodulated subblocks and the decoding results of the previous decoding round(s) as input information.

4. A method according to claim 1, wherein the step of determining whether the correct demodulation method was selected for a certain subblock comprises the substep of checking whether the selection of a certain demodulation method for a subblock breaches a rule of having a predefined minimum number of consecutive subblocks demodulated with a single demodulation method.

5. A method according to claim 4, comprising the steps of a) observing a change of selected demodulation method between a certain first subblock and a certain second subblock, b) checking, whether said first subblock together with the subblocks immediately preceding it and having the same demodulation method selected constitute a train of consecutive subblocks the length of which is at least equal to said predefined minimum number, c) as a response to a negative finding in step b), comparing a first measured value representing the quality in reception and associated with said observed change to a second similar value associated with the previous change of selected demodulation method constituting the beginning of the current train of subblocks for which the same demodulation method has been selected, d1) as a response to said first measured value indicating higher quality in reception than said second measured value, accepting said observed change as a valid change and indicating as many subblocks before said previous change to be unreliable as are needed to together with the first subblock constitute a train of consecutive subblocks the length of which is equal to said predefined minimum number, d2) as a response to said first measured value indicating lower quality in reception than said second measured value, accepting said previous change as a valid change, rejecting said observed change as an invalid change and indicating said second subblock to be unreliable, and e) converting the subblocks found to be unreliable to corresponding sequences of neutral soft decoding valued indicating equal probabilities for all allowed state transitions in the decoding process.

6. A method according to claim 1, wherein the step of determining whether the correct demodulation method was selected for a certain subblock comprises the substep of checking whether the selection of a certain demodulation method for a subblock breaches a rule of demodulating a certain part of a transmission frame structure always with a certain predefined demodulation method.

7. A method according to claim 1, wherein the step of determining whether the correct demodulation method was selected for a certain subblock comprises the substep of checking whether the selection of a certain demodulation method for a subblock breaches a rule of demodulating the subblocks relating to a certain logical transmission channel always with a certain predefined demodulation method.

8. A method according to claim 1, wherein the step of selecting one of a predefined number of demodulation methods for demodulating each subblock comprises the substep of checking whether a subblock is recognized with a certain level of certainty to have been modulated with a recognizable modulation method, and in case such recognition is not possible, selecting the same method for its demodulation which was selected previously when for the last time a subblock was recognized with a certain level of certainty to have been modulated with a recognizable modulation method.

9. A receiver for receiving, demodulating and decoding blocks of digital information consisting of a number of subblocks, comprising a selective demodulator for selectively demodulating received subblocks with the demodulation methods selected for each subblock and a decoder for assembling a number of demodulated subblocks into a block of digital information and decoding the assembled blocks;

wherein the decoder is a soft decoder arranged to handle each subblock as a sequence of soft decoding values associated with certain probabilities of allowed state transitions in the decoding process, the receiver is arranged to determine for each subblock whether the correct demodulation method was selected for it and the decoder is arranged to convert such subblocks to sequences of neutral soft decoding values for which it is found that the correct demodulation method was not selected, where said soft decoding values indicate equal probabilities for all allowed state transitions in the decoding process.

* * * * *